UNITED STATES PATENT OFFICE.

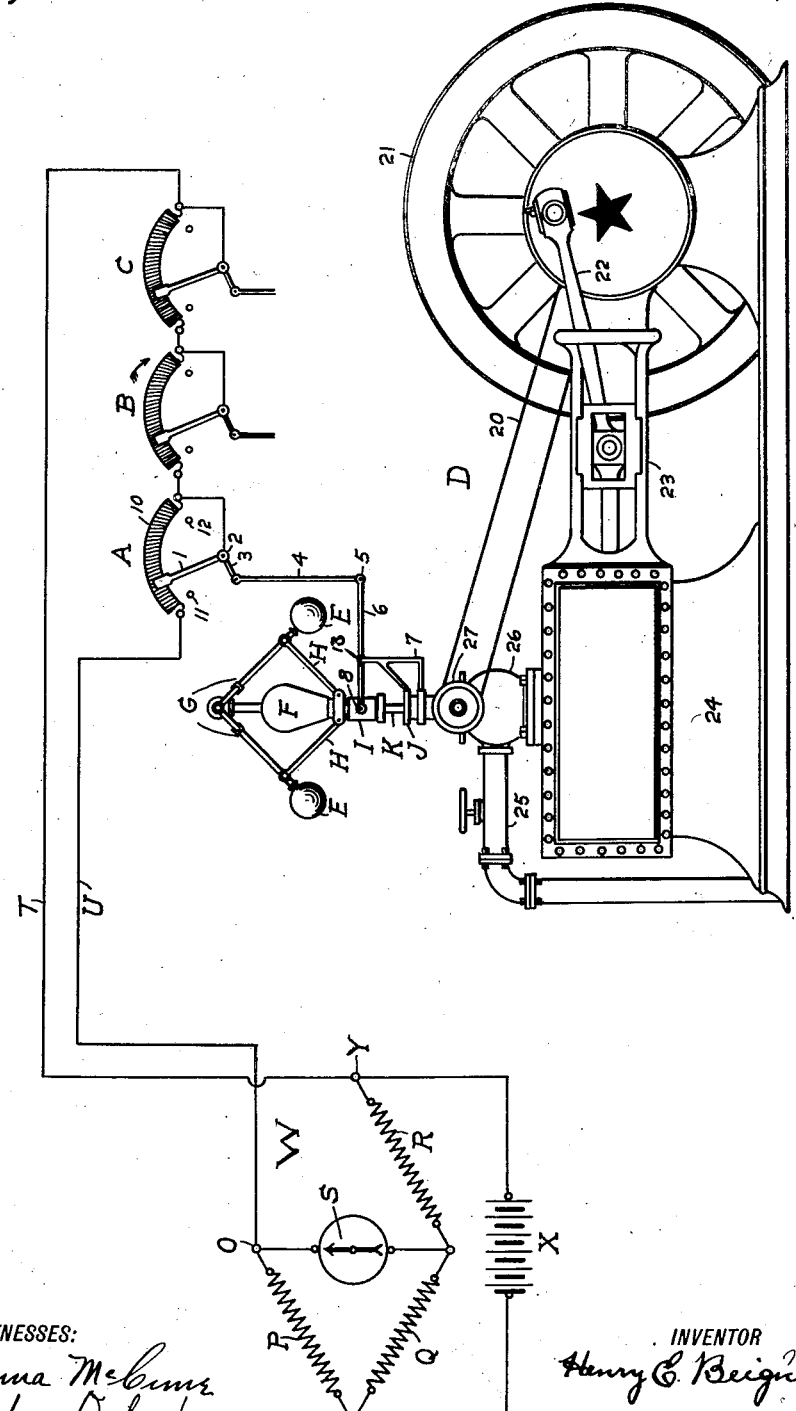

HENRY EARL BEIGHLEE, OF CLEVELAND, OHIO.

SPEED-INDICATING APPARATUS.

1,228,392.    Specification of Letters Patent.    Patented June 5, 1917.

Application filed October 20, 1914, Serial No. 867,675. Renewed November 8, 1916. Serial No. 130,275.

*To all whom it may concern:*

Be it known that I, HENRY EARL BEIGHLEE, a citizen of the United States, residing at Cleveland, in the county of Cuyahoga and State of Ohio, have invented certain new and useful Improvements in Speed-Indicating Apparatus, of which the following is a specification.

My invention relates to speed indicating apparatus and has for its object means for indicating or registering the speed or variation in speed of a plurality of machines, engines or rotating parts.

My invention is particularly applicable for indicating the sum of the speeds of a plurality of machines from a point distant from the machines themselves. I accomplish this result by using a speed indicating device which is common to a plurality of machines. This indicating device is controlled by the action of moving parts associated with the machines, and which under normal conditions operate at predetermined speeds. Any variation of speed of moving parts causes a corresponding variation to be registered on the speed indicating device.

The drawing shows partly diagrammatic, the application of my invention to a steam engine.

Referring to the drawing, I have shown the indicating device controlled by the action of governors associated with the machines, although, of course, some other operating parts of the machines may have been used for this purpose. D represents an engine or machine, while W represents the indicating device. The action of the indicating device is controlled by the governor of the engine D as will be described in the detail description to follow.

The indicating device is shown at W in the form of a Wheatstone bridge consisting of the galvanometer S, the ratio arms P and Q, the rheostat arm R and a source of current supply X.

An engine is shown at D provided with the standard ball type form of governor. This governor controls the rheostat A which consists of a resistance coil 10 regulated by the arm 1. The movement of the arm 1 is controlled by the movement of the sleeve I of the governor. This sleeve is loosely mounted upon the revolving shaft K which controls the action of the governor. This sleeve I moves up and down on the shaft K, the movement being controlled by the action of the governor arms H. In the drawing the governor is shown in the position it occupies while the engine D is running at its normal speed. The governor in this position maintains the arm 1 of the rheostat A in the position shown.

For purpose of illustration I have shown one engine only and three rheostats, but of course there will be one engine for each of the rheostats B and C. The arms of the rheostats B and C are also shown in the position they would assume while their engines are running at normal speed.

The resistance coils of the rheostats A, B and C are in series and connected to the points O and Y on the indicating device W by means of the conductors T and U. These resistance coils form the other arm of the bridge. With the arms of the rheostats A, B and C at rest the total resistance of the rheostat coils in circuits T and U which constitutes one arm of the Wheatstone bridge should equal the resistance of the rheostat arm R of the indicating device. When such condition exists, as would be the case when the engines are not running, the needle of the galvanometer S remains in its normal position. In case, however, any one of the arms of the rheostats A, B and C should change their position, the resistance would be either increased or decreased in the circuit extending between the indicating device and the rheostats A, B and C and, consequently, cause an effect to be produced in the indicating device W. In case the resistance in the circuit should be increased or decreased, the needle of the galvanometer would be deflected accordingly. The deflection of the needle would show in degrees according to the calibration of the galvanometer the combined speeds of the engines.

While the engine D is at rest balls E drop and cause the sleeve I to engage the shoulder J. The sleeve in restoring tilts the arm 6 which is fastened to the sleeve I at 8 and pivoted to the bracket 7 at 13. The arm 6 in tilting lifts the arm 4 with which it is pivoted at 5. The lifting of the arm 4 moves the arm 1 of the rheostat A until it engages the fixed stop 12. In this position all of the resistance of the coil 10 is placed in circuit. In case, however, the engine is running at an increased speed the arm 1 tends to engage the fixed stop 11 and decrease the resistance in the circuit leading to the indicating device at W.

The same result is accomplished by means of the arms of the rheostats B and C controlled by the governors of their respective engines.

From the foregoing description it will be noted when the engines are running, the total resistance in the circuit extending through the rheostats A, B and C as compared to the resistance of the rheostat arm R of the indicating device W will cause to be registered on the indicating device the sum of the speeds or total number of revolutions of all the engines.

While I have shown means for registering the sum of the speeds of three engines, it of course follows that my invention is applicable for registering the speed of a single machine or of any number of machines.

In case there are but three machines, each running at the rate of forty revolutions per minute, then the combined speed registered would be one-hundred and twenty. If only one machine was running the speed of forty revolutions would be registered.

Having thus described my invention what I desire to secure by Letters Patent is:

1. In a speed indicating apparatus, the combination with a plurality of moving parts, of a single indicating device, a common electrical circuit extending from said device to said moving parts, means controlled by said moving parts and exercised over said circuit for causing to be indicated on said device the sum of the speeds of the rotating parts, substantially as set forth.

2. In a speed indicating apparatus, the combination with a plurality of rotating parts, of a single indicating device, a common electrical circuit extending from said device to said rotating parts having a certain resistance, means controlled by said rotating parts for varying said resistance, the variation in resistance causing to be indicated by said device the sum of the speeds of the rotating parts, substantially as set forth.

3. In a speed indicating apparatus, the combination with a plurality of rotating parts, of a single indicating device, a common electrical circuit extending from said device to said rotating parts, governors associated with said rotating parts, means controlled by said governors and exercised over said control circuit for causing to be indicated the sum of the speeds of said rotating parts on said device, substantially as set forth.

4. In a speed indicating apparatus, the combination with a plurality of rotating parts, of a single indicating device, a common agency connecting said parts and said device, of means controlled by said rotating parts for registering on said device by the medium of said agency the sum of the speeds or variation in speeds of the rotating parts, substantially as set forth.

5. In a speed indicating apparatus, the combination with a single indicating device, of a plurality of rotating parts, a two-conductor control circuit extending from said device to said rotating parts, means individual to each of said rotating parts for causing variations in said control circuit, said variations causing to be indicated on said device the sum of the speeds of the rotating parts, substantially as set forth.

6. The combination with a speed indicating device, of a plurality of rotating parts, variable resistance units associated with each of said rotating parts, of a common electrical circuit extending between said units and said indicating device, of means controlled by said rotating parts for varying the resistance of said units, said variation of resistance being indicated on said device over said electrical circuit, substantially as set forth.

7. In a speed indicating apparatus, the combination with a plurality of rotating parts, a single indicating device, of variable resistance units associated with each of said rotating parts, of means controlled by said rotating parts for varying said resistance and causing such variation to be registered on said device, substantially as set forth.

8. In a speed indicating apparatus, the combination with a plurality of rotating parts, of a registering device comprising a Wheatstone bridge, of means controlled by said rotating parts for causing to be registered by said device the sum of the speeds of said rotating parts, substantially as set forth.

9. The combination with a speed indicating device comprising a Wheatstone bridge, of a rheostat arm for said bridge having a predetermined resistance, of a plurality of rotating parts, a resistance circuit extending between said indicating device and said rotating parts, means controlled by said rotating parts for causing the resistance of said circuit to vary as compared with the resistance of the rheostat arm, substantially as set forth.

10. The combination with a speed indicating device comprising a Wheatstone bridge, of a rheostat arm for said bridge having a predetermined resistance, of a plurality of rotating parts, variable resistance units associated with said parts, the total resistance of all of said units under normal conditions being equal to the resistance of the rheostat arm, of means controlled by said rotating parts for varying the resistance of said units as compared with the resistance of the rheostat arm, substantially as set forth.

11. The combination with a speed indicating device comprising a Wheatstone bridge, of a rheostat arm for said bridge having a predetermined resistance, a plurality of rotating parts, variable resistance units associated with said rotating parts, means controlled by said rotating parts for maintaining the resistance of said units in comparison to the resistance of the rheostat arm, substantially as set forth.

12. The combination with a speed indicating device comprising a rheostat arm, said rheostat arm having a predetermined resistance, of a plurality of rotating parts, resistance units associated with said parts normally equal to the resistance of said rheostat arm, of means controlled by said rotating parts for varying the resistance of said units at variance with the resistance of said rheostat arm, additional means for registering on the indicating device such variation, substantially as set forth.

13. In a speed indicating apparatus, the combination with a plurality of rotating parts, of an indicating device comprising a Wheatstone bridge, a rheostat arm for said bridge having a predetermined resistance, of an electrical circuit extending to said rotating parts from said indicating device having a variable resistance, means controlled by said rotating parts for varying said resistance in said circuit as compared with the resistance of the rheostat arm, substantially as set forth.

14. The combination with a speed indicator comprising a Wheatstone bridge having a predetermined resistance, of a rheostat arm for said bridge, of a plurality of rotating parts, of a circuit extending to said rotating parts having a resistance normally equal to said rheostat arm, means controlled by said rotating parts for causing a variance in the resistance of said circuit as compared with the resistance of said rheostat arm, additional means for registering the variation in resistance on said indicator, substantially as set forth.

In testimony whereof I affix my signature in presence of two witnesses.

HENRY EARL BEIGHLEE.

Witnesses:
   Jos. E. Drucker,
   W. M. Rea.